United States Patent
Schneider et al.

(10) Patent No.: US 6,375,369 B1
(45) Date of Patent: Apr. 23, 2002

(54) HOUSING FOR A SURVEILLANCE CAMERA

(75) Inventors: Peter Gerard Schneider, Decatur; James Lawrence Pfaffenberger, II, Marietta, both of GA (US)

(73) Assignee: Videolarm, Inc., Decatur, GA (US)

( * ) Notice: Subject to any disclaimer, the term of this patent is extended or adjusted under 35 U.S.C. 154(b) by 0 days.

(21) Appl. No.: 09/296,967

(22) Filed: Apr. 22, 1999

(51) Int. Cl.[7] .............................................. G03B 17/00
(52) U.S. Cl. ...................................... 396/427; 348/143
(58) Field of Search ............................... 396/427, 428; 348/143, 148, 150, 151, 152

(56) References Cited

U.S. PATENT DOCUMENTS

| | | | |
|---|---|---|---|
| 3,879,742 A | * 4/1975 | Smith | 396/427 |
| 4,320,949 A | 3/1982 | Pagano | |
| 4,414,576 A | * 11/1983 | Randmae | 348/151 |
| D275,294 S | 8/1984 | Pagano | |
| 4,618,886 A | * 10/1986 | Mooney | 396/427 |
| 4,651,144 A | 3/1987 | Pagano | |
| 4,652,930 A | * 3/1987 | Crawford | 348/143 |
| 4,796,039 A | 1/1989 | Pagano | |
| 4,890,713 A | 1/1990 | Pagano | |
| 4,920,367 A | 4/1990 | Pagano | |
| D307,759 S | 5/1990 | Pagano | |
| D314,501 S | 2/1991 | Pagano | |
| 5,107,286 A | 4/1992 | Sergeant et al. | |
| 5,214,245 A | * 5/1993 | Bernhardt et al. | 348/151 |
| 5,223,872 A | 6/1993 | Stiepel et al. | 354/81 |
| 5,224,675 A | * 7/1993 | Ellenberger et al. | 396/427 |
| 5,240,220 A | * 8/1993 | Elberbaum | 396/427 |
| 5,394,184 A | 2/1995 | Anderson et al. | 348/151 |
| 5,394,209 A | 2/1995 | Stiepel et al. | |
| 5,689,304 A | 11/1997 | Jones et al. | 348/373 |
| 5,689,734 A | 11/1997 | Bauer et al. | |
| 5,765,043 A | 6/1998 | Tyler | |
| 5,852,754 A | 12/1998 | Schneider | 396/427 |
| 5,940,122 A | * 8/1999 | Kizawa et al. | 348/151 |
| 6,081,240 A | * 6/2000 | Hemmingsen, II | 343/760 |

\* cited by examiner

*Primary Examiner*—David M. Gray
(74) *Attorney, Agent, or Firm*—Gardner Groff & Mehrman, P.C.

(57) ABSTRACT

A housing assembly permitting the adjustable positioning a surveillance camera enclosed therein. The housing assembly comprises a housing having a cylindrical camera opening therein for receiving the surveillance camera., a camera sled, a detachable lens assembly. The camera sled holds the surveillance camera and is slidably receivable in and rotatable about the longitudinal axis of the camera opening. The camera sled includes positioning means for adjustably fixing the position and orientation of the camera sled assembly within the camera opening. The ballistic lens assembly encloses the camera sled and surveillance camera within the housing.

In an alternate embodiment the housing assembly further comprises a pan and tilt mechanism which permits the housing assembly to be manually position within a predetermined range of pan and tilt and acts as a wireway for the camera cabling. The pan and tilt mechanism is reversible and affords protection to camera wiring passing therethrough even when the housing assembly is fully tilted. In another embodiment of the invention, the lens assembly includes a replaceable protective transparent shield for the ballistic lens. The lens and protective shield can be made of ballistic or non-ballistic grade materials.

23 Claims, 8 Drawing Sheets

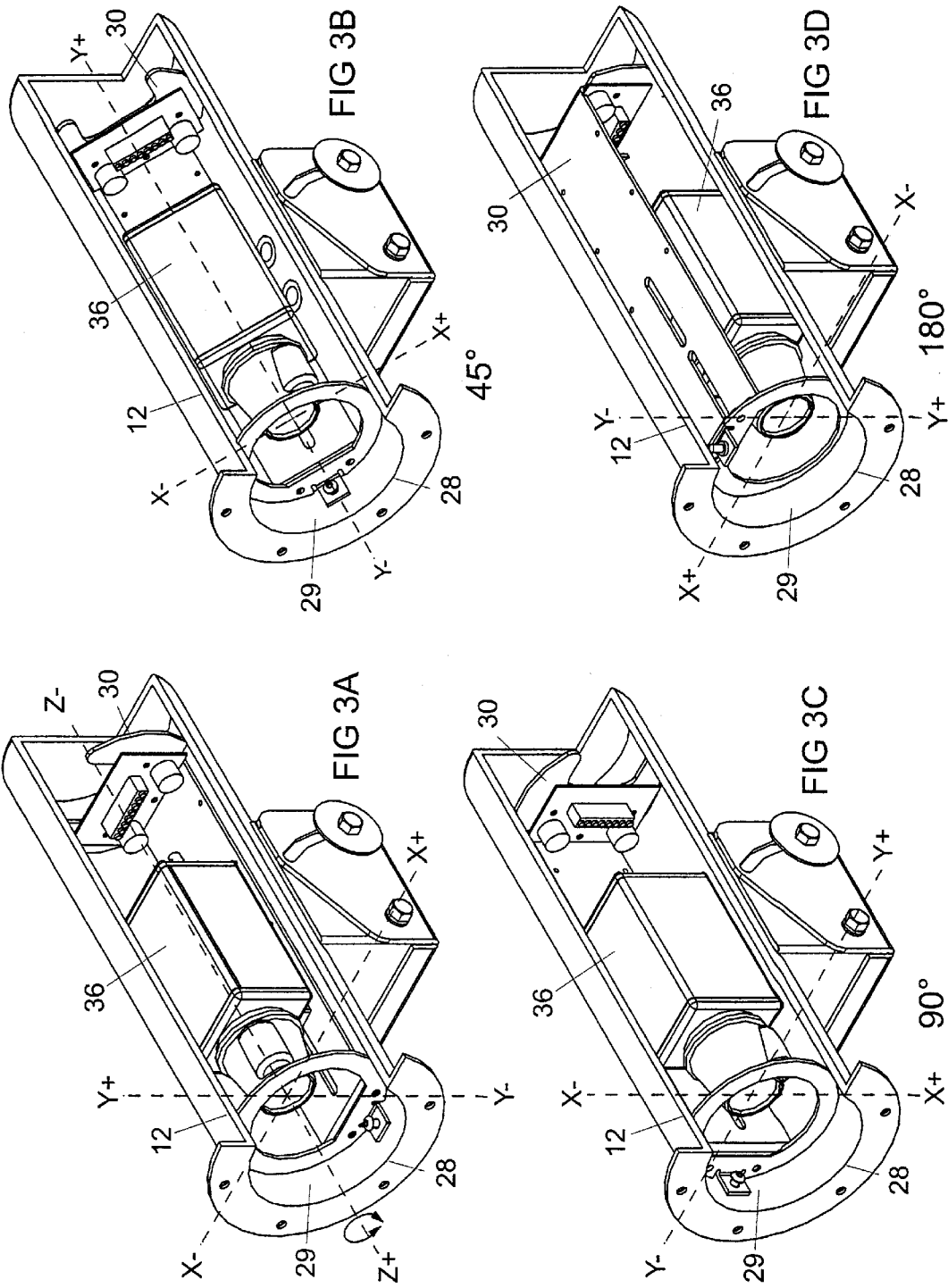

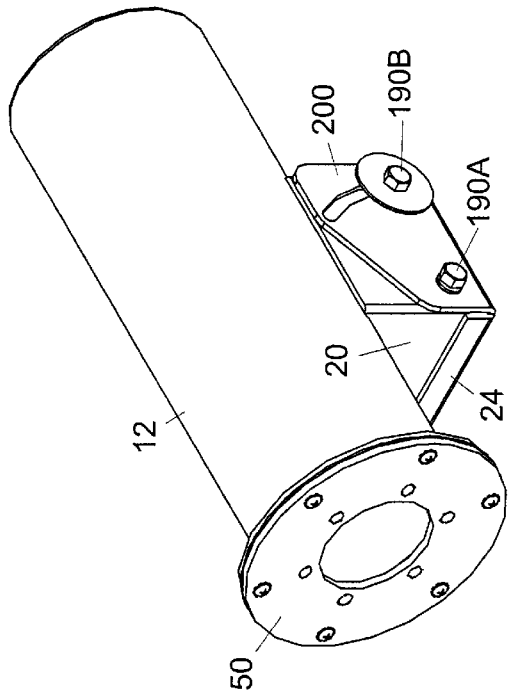
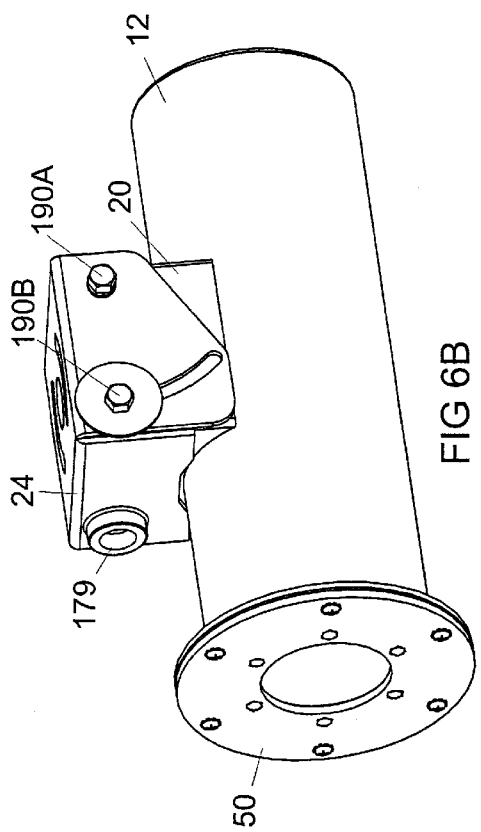

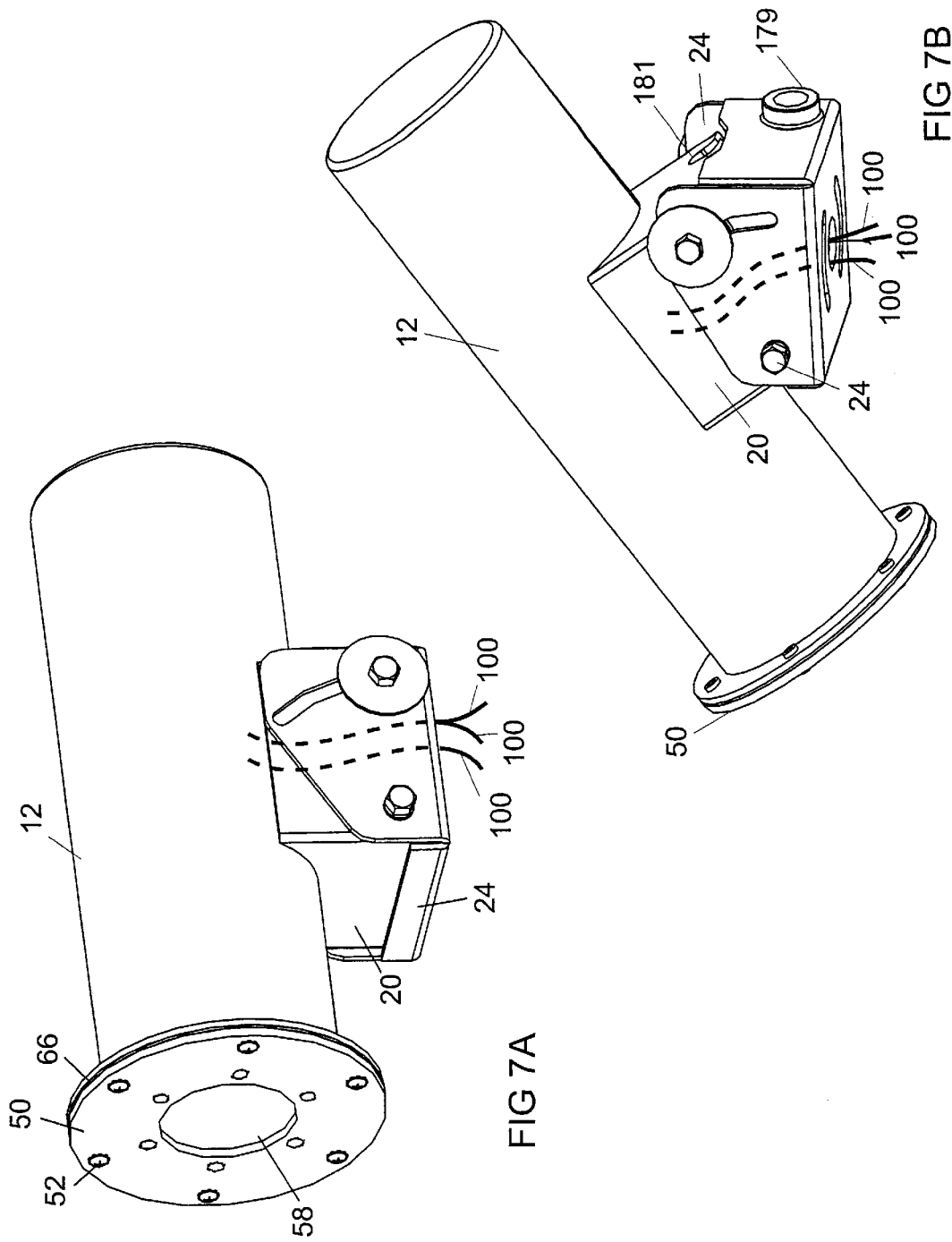

HOUSING FOR A SURVEILLANCE CAMERA

CROSS-REFERENCE TO RELATED INVENTIONS

Not Applicable

STATEMENT REGARDING FEDERALLY FUNDED RESEARCH

Not Applicable

REFERENCE TO A MICROFICHE INDEX

Not Applicable

COPYRIGHT NOTICE

Copyright 1999. A portion of the disclosure of this patent document contains materials which are subject to copyright protection. The owner has no objection to the facsimile reproduction by anyone of the patent document or patent disclosure, as it appears in the Patent and Trademark Office patent file or records, but otherwise reserves all rights, copyright rights whatsoever.

BACKGROUND OF THE INVENTION

1. Field of the Invention

This invention generally relates to surveillance equipment and systems; and more particularly, to a fixed position housing assembly using a ballistic lens for housing surveillance equipment components including the surveillance camera which housing permits the continuous adjustment of the camera within the housing to overcome non vertical and non horizontal mounting positions, provides a replaceable shield for the ballistic lens and provides a tilt and pan bracket that substantially encloses the wiring connecting the camera to the surveillance system.

2. Background Information

Closed circuit video surveillance equipment is very useful and well established. For instance, video cameras can be installed throughout a facility such as a perimeter and public areas, places of business, parking lots, hospitals, government buildings, etc. A central command center is provided for selecting, displaying and recording of an output of any given video camera of the installed cameras. Thus, a small number of security personnel stationed at a central command center can officially monitor an entire facility by selecting, displaying and recording the output of any given camera.

Video surveillance equipment can be fixed positioned camera and zoom lenses. Fixed positioned cameras are useful for wide angle shots or limited view applications such as entrances and exits. Zoom lenses are used to increase a quality of captured video by allowing security personnel to zoom in on a small portion of a screen in order to evaluate and/or distinguish elements of the scene in greater detail. For targets that move within in a scene, the zooming function is of limited usefulness, unless the observation direction of the camera can likewise move. Therefore, cameras having zoom lenses are generally mounted on a pan and tilt mechanisms. Such pan and tilt mechanisms are typically controlled via the control command center by the security personnel.

In outdoor applications, an enclosure is employed to protect the camera from precipitation, extremes in temperature and unauthorized tampering. The optical quality of the window or lens through which the camera views its prescribed viewing area must be very good. For fixed position cameras, this window is often flat, typically made of a ballistic material and positioned at one end of a long housing containing the camera power supply, camera body and lens. Advantages of this type of housing include the ability to use window materials that are manufactured in sheet form and to completely seal the enclosure cost effectively using usually with o-rings in a cylindrical-type configuration. Cooling the interior of the sealed unit is usually accomplished by conduction only or by forced convection systems that circulate outside air into the enclosure typically are not used with such operations.

The cylindrical housings typically have the camera fixed within the housing and the housing is then mounted via bracket to a roof surface, a wall, a ceiling, or a overhang of the building. The bracket used for the mounting of these housings usually includes a means for tilting the housing and/or leveling the housing in a fixed positioned within a given range of tilt and pan. However, there are instances in which the housing cannot be positioned such that the camera produces an image that has normal viewing orientation. It would be advantageous to have a housing which would allow for the easy orientation of the camera despite a non-level positioning of the housing.

Also, with such housings which are permitted to tilt, at times the wiring and cables running into the housing for controlling the camera and providing the video output can be exposed as the housing is tilted on its bracket. It would be advantageous to have a bracket which would allow for the tilting of the housing yet keep the wiring inaccessible to persons attempting to damage the surveillance unit. Lastly, when dealing with fixed position surveillance cameras, the lens assemblies on the units are frequently spray painted or otherwise damaged by vandals. The lens material is usually constructed of a ballistic material which is expensive. It would therefore be advantageous to provide a protective shield which is readily replaceable so that if the unit were spray painted, the protective shield would bear the brunt of the attack protecting the ballistic lens.

SUMMARY OF THE INVENTION

The present invention is a housing assembly permitting the adjustable positioning a surveillance camera enclosed therein after the housing is mounted. The housing assembly comprises a housing having a cylindrical camera opening therein for receiving the surveillance camera, camera sled, and a detachable lens assembly. The camera sled holds the surveillance camera and is slidably receivable in and rotatable about the longitudinal axis of the camera opening. The camera sled includes positioning means for adjustably fixing the position and orientation of the camera sled assembly within the camera opening. The detachable lens assembly encloses the camera sled and surveillance camera within the housing.

In an alternate embodiment the housing assembly further comprises a pan and tilt mechanism which permits the housing assembly to be manually positioned within a predetermined range of pan and tilt and acts as a wireway for the camera cabling. The pan and tilt mechanism is reversible and affords protection to camera wiring passing therethrough even when the housing assembly is fully tilted. In another embodiment of the invention, the lens assembly includes a replaceable protective transparent shield for the lens. The lens and protective shield can be made from non-ballistic or ballistic grade materials.

BRIEF DESCRIPTION OF THE DRAWINGS

For a better understanding of the invention reference may be made to the preferred embodiments of the invention shown in the accompanying drawings where:

FIGS. 3A through 3D are isometric cut away views of the invention showing the rotation of the camera sled assembly illustrating, in FIGS. 3A, 3B, 3C, and 3D, respectively, 0 degree, 45 degree, 90 degree and 180 degree clockwise rotation of the camera sled assembly within the housing.

FIGS. 6A and 6B are exploded isometric drawings showing the reversibility of the housing bracket; with FIG. 6A illustrating the bracket positioned for a normal installation position on a rooftop or wall bracket and FIG. 6B illustrating the bracket position in a reversed position for an inverted installation position under an overhang.

FIGS. 7A and 7B are isometric drawings of the invention illustrating the wire protection feature of the present invention with FIG. 7A showing the housing in a level or non-tilted position and FIG. 7B showing the housing in a fully tilted position with the internal wiring remaining substantially enclosed.

DETAILED DESCRIPTION OF THE INVENTION

Figure 1:
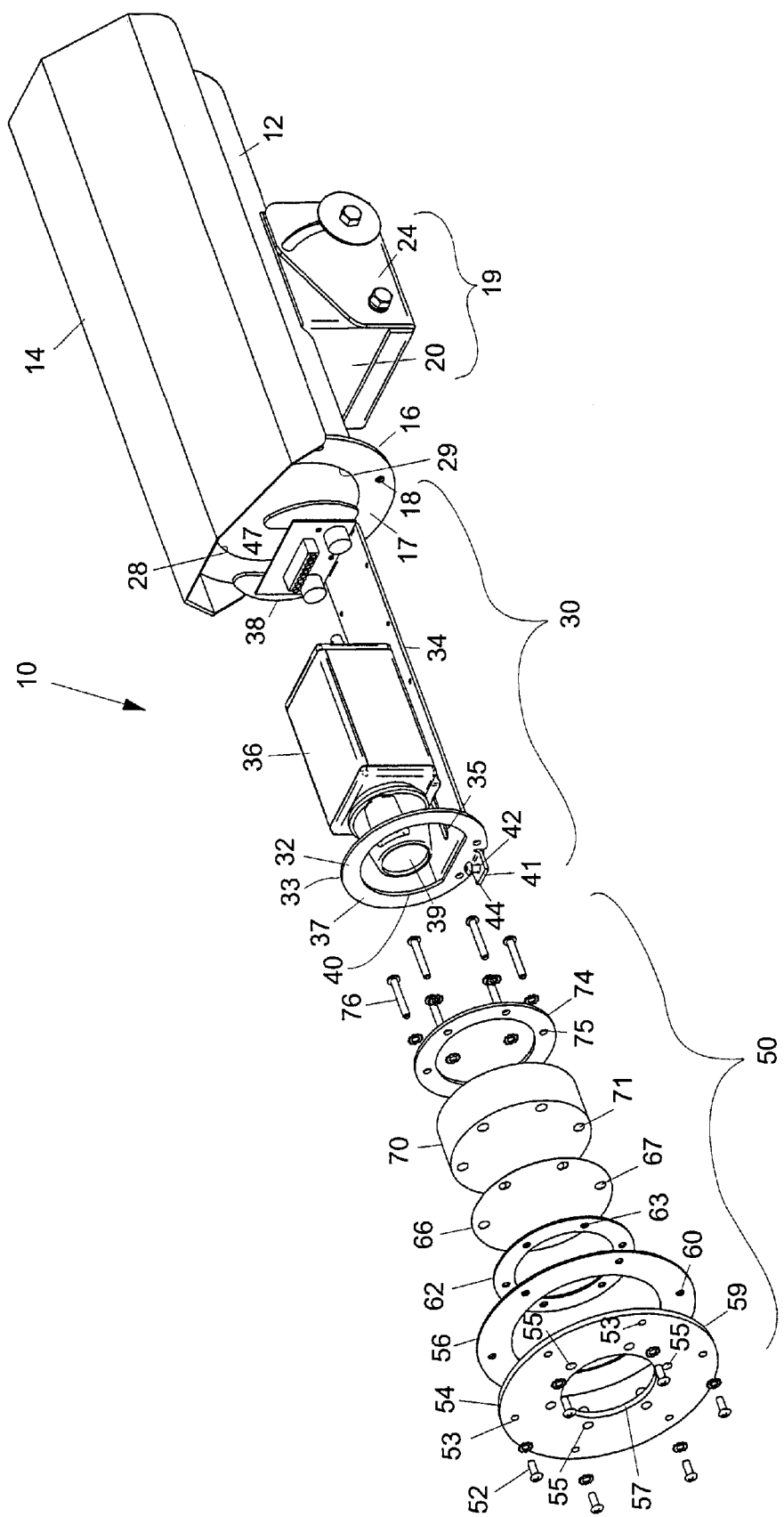
FIG. 1 is an exploded isometric drawing of the housing of the present invention.

FIG. 1 illustrates an exploded view of the housing assembly 10 of the current invention. Shown in FIG. 1 is outer housing 12 having a sun shield 14 installed about the upper portions of the housing 12. The housing 12 has a mounting flange 16 having a plurality of holes 18 there through positioned radially about the flange. Also attached to housing 12 is a pan and tilt assembly 19 comprising a housing cradle 20 and attached bracket 24. Bracket 24 is used for mounting the housing 12 to a roof or to a mounting stand (not shown). Preferably, housing 12 is cylindrical in shape and has a cylindrical opening 28 in one end extending along the longitudinal axis of the housing 12. For reference purposes, the end of the housing having opening 28 is termed the front, front end or front face. The opposite end of the housing is termed the rear, rear end or the rear face.

Inserted into opening 28 of housing 12 is a camera sled assembly, generally indicated at 30. The camera sled 30 is slidably receivable and rotatable about the longitudinal axis of the opening 28 in housing 12. The camera sled 30 comprises an annular sled plate 32 having an outer diameter such that the sled plate is closely received in the opening 28 while being rotatable about the longitudinal axis of opening 28. Depending from rear surface 33 of sled plate 32 is a planar camera bed 34 on which is mounted the surveillance camera 36 and a printed circuit board 38. Camera bed 34 is sized such that the sides do not touch the wall 29 of opening 28. This permits easy rotation of camera sled assembly 30. Preferably, camera bed 34 is spaced away from the longitudinal axis of the opening 28 to allow camera lens 40 to be substantially in line with the longitudinal axis. Camera bed 34 is attached to sled plate 32 by anyone of several fastening meanings as is known in the art, e.g. welding, brazing, bolts, a keyed slot. The fastening means used for camera bed 34 is not crucial. A slot 35 is provided in camera bed 34 and is used for the attachment of camera 36 to camera bed 34. Camera lens 39 is aligned with annular opening 40 in sled plate 32. Opening 40 is of sufficient diameter so as not to occlude or block camera lens 39. Camera sled 30 includes positioning means for fixing the position and orientation of the camera sled within the opening 28.

Preferably, a rear sled plate 46 is attached to the rear end of camera bed 34. The rear sled plate is circular and is sized to be closely received and rotatable within opening 28. Rear sled plate 46 includes an opening 47 therethrough through which the cabling is run to camera 36. Rear sled plate 46 may be formed from a portion of camera bed 34 which is bent substantially perpendicular to the plane of the top surface of camera bed 34 (see FIG. 2) with the bent portion have arcuate outer edges that are closely received within opening 28. Rear sled plate 46 helps to support the weight of camera bed 34, camera 36 and printed circuit board 38 which can alternatively be mounted on the front surface of rear sled plate 46 (see FIG. 2). Because rear plate 46 is in contact with the wall 29 of opening 28, camera bed 34 and camera 36 are prevented from vibrating within opening 28. Use of rear sled plate 46 allows the thickness of sled plate 32 and camera bed 34 to be thinner than if camera bed 34 is cantilevered from sled plate 32. Also the tolerance or space between the sled plate 32 and the wall 29 of opening 28 can be greater than if no rear sled plate was used. Further, if sled plate 46 is not used, sled plate 32 and camera bed 34 must be of sufficient stiffness so as to substantially dampen any vibrations that may cause camera bed 34 and camera 36 to oscillate.

The positioning means for sled assembly 30 depends from front surface 37 of sled plate 32 and is comprised of a tab 41 having a threaded hole therein 42 for receiving set screw 44. Hole 42 and set screw 44 are positioned such that when set screw 44 is threaded into hole 42 the end of set screw 44 will contact wall 29 of opening 28 to fix the position and orientation of the camera with respect to the housing 12. Preferably, tab 41 is formed by cutting two parallel slots into sled plate 32 and bending the plate material intermediate the slots about 90 degrees to form tab 41. Tab 41 may also be attached to sled plate 32 by other well known fastening means such as welding, brazing, bolts, a keyed slot, etc. In lieu of tab 41 a nut may be welded or brazed to the front surface 37 of sled plate 32. Also the positioning means can be located on the rear surface of sled plate 32, in which case it would be accessed via opening 40 or an opening provided in camera bed 34 for that purpose. When camera sled assembly 30 is inserted into the opening 28 of housing 12, sled assembly may be rotated about the longitudinal axis of opening 28 in housing 12. When the proper orientation of the camera is achieved, set screw 44 is tighten against wall 29 of opening 28. This slightly cants or angles sled assembly 30 thereby locking its position in place within the opening 28. A groove (not shown) can be machined into wall 29 of opening 28 which would receive the end of set screw and would also serve as a insertion guide when camera sled assembly 30 is slidably positioned therein. Alternatively, a spring loaded positioning means can be used in conjunction with a ring of detents machined into wall 29 as is known in the art. By pulling on a spring loaded pin, the pin would be released from a detent allowing for the rotation of camera sled assembly. When the desired orientation of the camera is achieved, the pin is released to seat in a detent. In a further embodiment of the positioning means, a cam may be rotatably mounted on sled plate 32 adjacent the edge of the plate, as shown in FIG 2C. When the desired orientation of the camera is achieved, the cam would be rotated into contact with wall 29 also forcing the edge of sled plate 32 opposite the cam into contact with the wall 29 of opening 28.

Figure 2B:
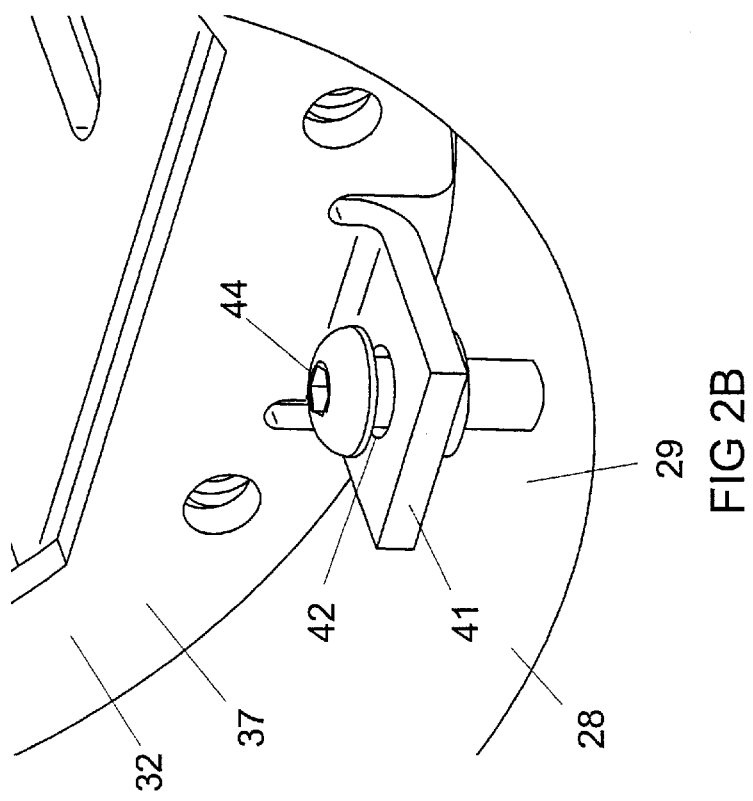
FIGS. 2A and 2B are cut away isometric views of the housing of the present invention illustrating the positioning adjustment means shown in the released position in FIG. 2A and in the engaged position in FIG. 2B.
Figure 2A:
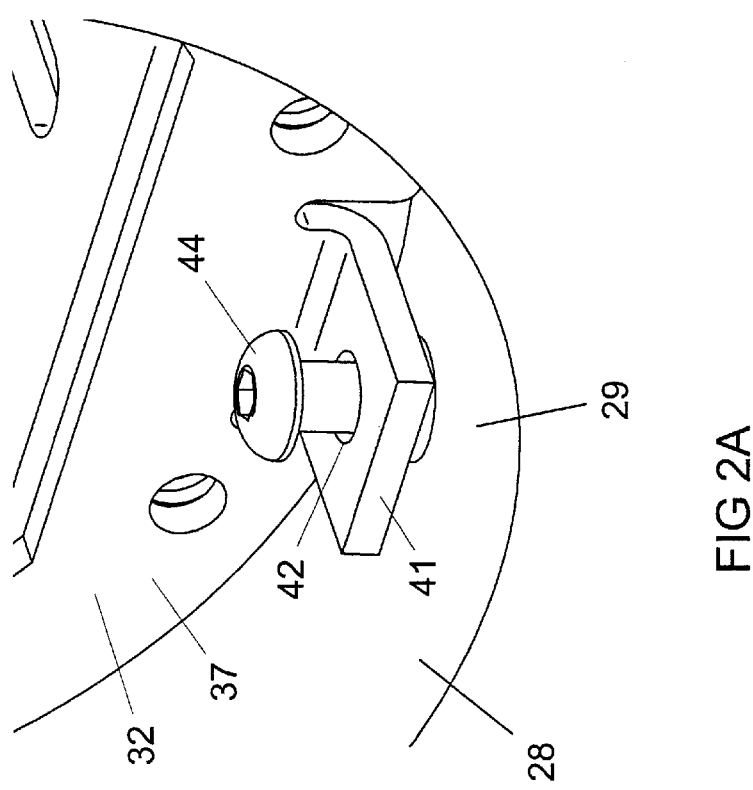
Figure 2C:
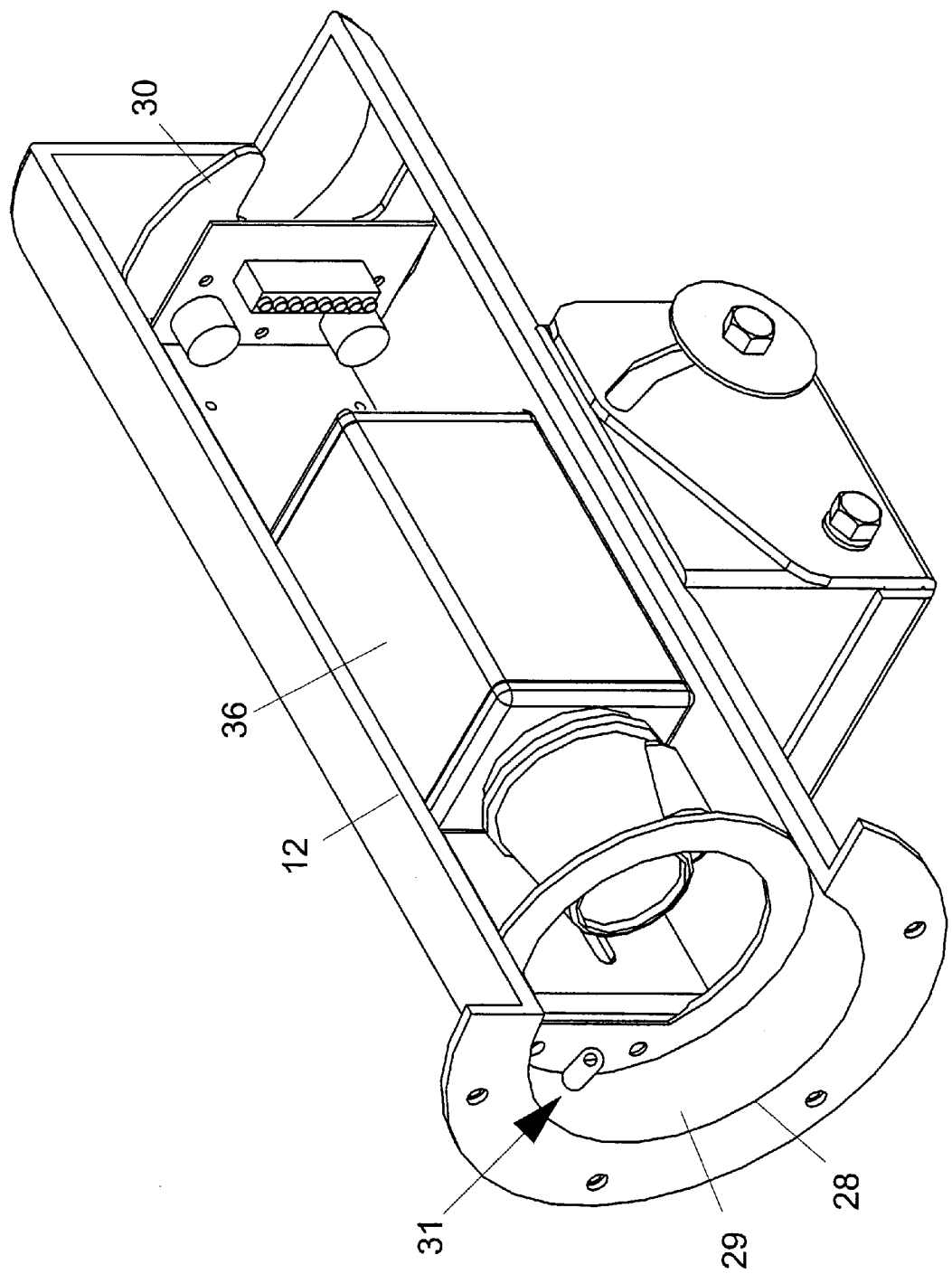
FIG. 2C is a view of a cam used as an implementation of the positioning means for the housing.

The adjustability of the camera sled 30 is illustrated in FIGS. 2A, 2B, and 3A–3D. FIG. 2A illustrates set screw 44 in the released position allowing for rotation and positioning of camera sled assembly 30 within opening 28 while FIG. 2B illustrates set screw 44 in the engaged position with wall 29 of opening 28. FIG. 3A illustrates camera sled 30 in a normal position such as would be used if the housing assembly 10 were mount on a flat horizontal surface. X, Y, and Z axes are shown. The X+-X- axis represents the horizontal, the Y+-Y- axis, the vertical, and the Z+-Z- axis, the longitudinal axis of opening 28 in housing 12. FIG. 3B illustrates a 45 degree clockwise rotation of camera sled assembly 30. FIG. 3C illustrates a 90 degree clockwise rotation of camera sled assembly 30. FIG. 3D illustrates a 180 degree clockwise rotation of camera sled assembly 30. Rotation of camera sled assembly 30 can continue through 360 degrees of rotation or more depending upon the amount of slack in the wires 100. Rotation can be either clockwise or counter-clockwise in direction.

Referring again, to FIG. 1, a detachable lens assembly 50 is used to enclose the sled assembly 30 within opening 28 of housing 12. Preferably, lens assembly 50 comprises an annular cap plate 54, flange gasket 58, lens gasket 62, protective shield 66, lens 70, annular end plate 74, and lens fastening means such as bolts 76 and assembly fastening means such as bolts 52. Cap plate 54 has two sets of holes therethrough—a first set 53 radially positioned at a first distance about the outer edge of the cap so as to be aligned with holes 18 in flange 16, the second set of holes 55 radially positioned at a second distance adjacent the opening 57 in cap plate 54. The first gasket, the flange gasket 58, has a plurality of holes 60 therethrough corresponding to the first set of holes 55 in cap plate 54, seats against the rear surface of cap plate 54 and front surface 17 of flange 18 and seals the connection between end plate 54 and the housing 12 occurring at flange 16. The second gasket, lens gasket 62, is positioned inside of flange gasket 58 and seats against the rear surface 59 of the cap end plate 54. Lens gasket 62 has a plurality of radially positioned holes 63 that correspond to and align with holes 55 in cap plate 54. Cylindrical transparent shield plate 66 is positioned between gasket 62 and lens 70. Shield plate 66, lens 70 and end plate 74 each have a plurality of radially positioned holes 67, 71, and 75, respectively, that correspond to and align with holes 55 in cap plate 54. Preferably, transparent shield plate 66 is made out of a thin polycarbonate material such as LEXAN® brand polycarbonate and lens 70 is made from a ballistic grade of polycarbonate material such as LEXGARD® SP-1250 brand of polycarbonate laminate, both being manufactured by GE Plastics division of General Electric Company. The thickness of shield plate 66 is about ¼ inch (0.635 cm) and that of lens 70 is about 1½ inches (3.8 cm). Alternatively shield plate 66 and lens 70 can be made from acrylic, styrene, and glass. Shield plate 66 can also be made of ballistic grade polycarbonate.

A plurality of bolts 76 is used to attach end plate 74, lens 70, protective shield 66 and lens gasket 62 to rear surface 59 of cap plate 54 via holes 75, 71, 76, and 63. After these are attached, the lens assembly can then be attached to flange 16 via holes 53 and 18 using bolts 52. The lens gasket 62, shield plate 66, lens 70 and end plate 74 are sized to be easily received within opening 28. The annular openings in lens gasket 62, and end plate 76 correspond in diameter to annular opening 40 in sled plate 32. The annular opening 57 in cap plate 54 is of a smaller diameter than that used for end plate 74 in order to provide a seating surface on cap plate 54 for lens gasket 62, shield plate 66, lens 70 and end plate 74 but annular opening 57 is at least as large as the diameter of camera lens 39 so as not to block the view of camera 36.

In the event that the surveillance camera housing has been vandalized by painting or other means to block the view of the camera, shield plate 66 would receive the brunt of the abuse protecting lens 70. Because shield plate 66 is made out of material that is usually less expensive than lens 70, this material is more easily replaced in comparison.

In an alternate embodiment (not shown), the lens assembly comprises an annular cap plate having a plurality of through holes radially positioned about the plate, a protective shield, and a ballistic lens. Fastening means, such as bolts, for coaxially and removably attaching the ballistic lens and shield to the cap plate are provided. The protective shield is positioned between the front of the lens and the rear surface of the end plate. Here the lens assembly can be attached to the housing 12 using flange 16. Alternatively, cap plate and the portion of the wall 29 adjacent the front of the housing can be threaded allowing the lens assembly to be screwed into opening 28. An O-ring can be provided to help seal the opening between the lens assembly and the wall 29 of opening 28. With this arrangement, flange 16 on housing 12 would not be used. Although the lens assembly is shown for use with a housing assembly that is described as being mounted outdoors, such housing assembly can also be used indoors. Also, the lens assembly may also be used with an indoor housing assembly such as those found in an elevator or in corridors.

Figure 4:
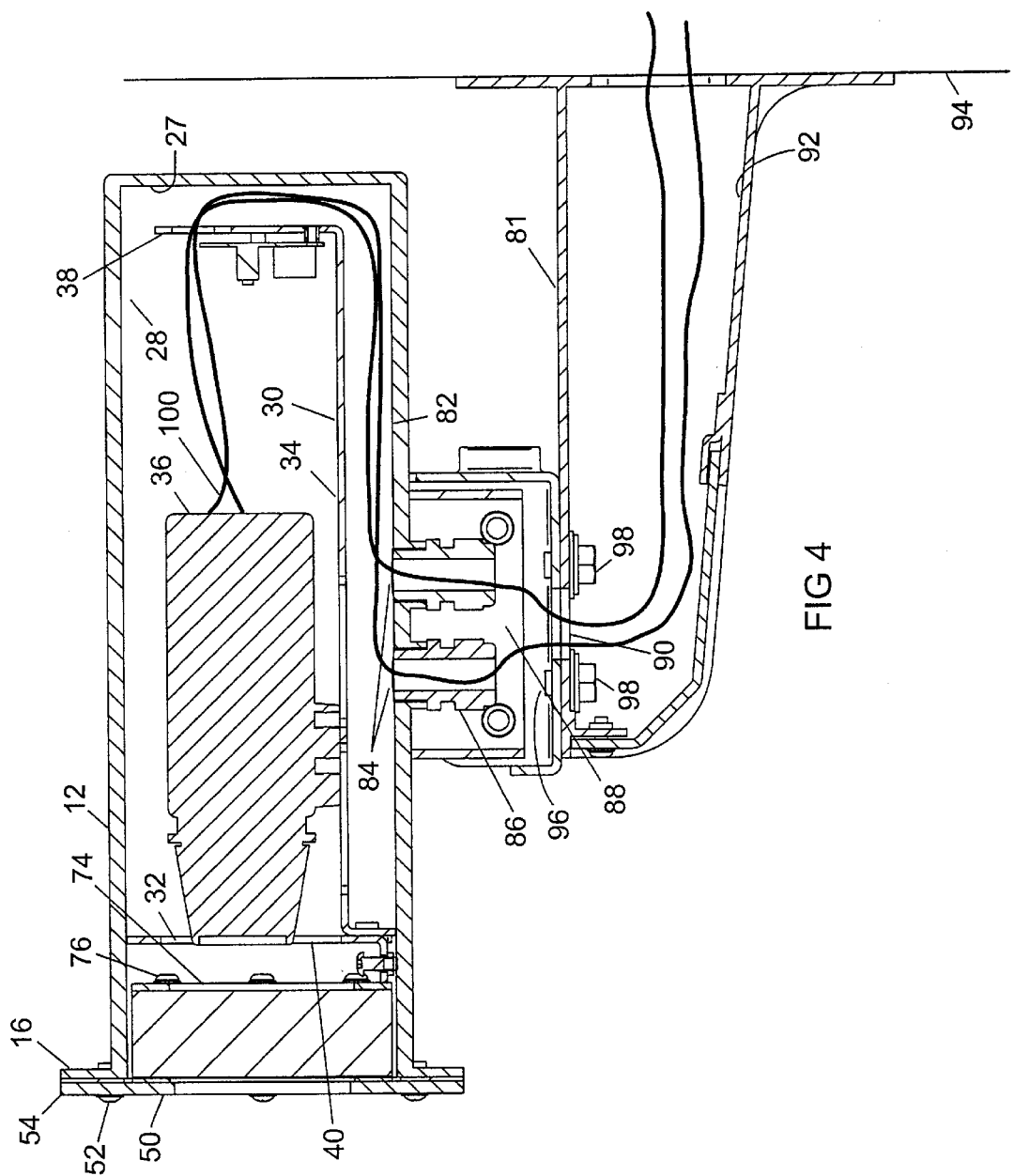
FIG. 4 is cross-sectional view of the housing of the present invention shown mounted on a wall bracket.

Referring now to FIG. 4, the cross section of an assembled unit 10 is shown mounted a hollow wall mount arm 81. The assembled lens cap assembly 50 is shown mounted on housing 12 using bolts 52. Positioned to the rear or behind end plate 74 is camera sled assembly 30 having camera 36 mounted thereon. As shown in this view, camera lens 39 extends through annular opening 40 of sled plate 32 and comes in contact with sled plate 32. This helps to further stiffen camera sled assembly 30. Slot 35 provided in the plate 32 for attaching camera 36 allows camera 36 to be slidably positioned along the longitudinal axis of the opening 28 and to extend through opening 40. Camera 36, once positioned, is held in place by a fastening means such as a bolt (not shown). Camera sled assembly 30 is slidably positioned in opening 28 so that the rear end of camera sled assembly 30 is adjacent to but spaced apart from bottom 27 of opening 28 allowing space for wires 100 that are attached to camera 36. Wires 100 are routed through an opening 47 (See FIG. 1) provided in rear sled plate 38. Opening 47 is preferably positioned about the longitudinal axis of opening 28. Wires 100 are then routed into space 82 formed between sled bed 34 and bottom 15 and wall 29 of opening 28. Wires 100 exit housing 12 via openings 84 provided for that purpose. Also shown in this figure are strain relief fittings 86 which may be used with the wires as they exit housing 12. Wires 100 pass through a passageway 88 formed by the cradle 20 and the bracket 24 and exit the housing assembly 10 through hole 90 provided in the base of bracket 24. Wires 100 enter the interior 92 of wall arm 81 and then into the wall 94. Advantageously, the routing of wires 100 from camera 36 into the wall is such that wires 100 are substantially inaccessible to outside parties. Nuts 98 and bolts 96 are used to secure bracket 24 to mounting arm 81. Bolts 96 are received in opposed arcuate slots provided in the base of bracket 24 (See FIG. 5). These slots allow housing assembly 10 to be panned within a limited range. Nuts 98 and bolts 96 are then be tightened when housing assembly 10 has been panned to the desired surveillance position.

Figure 5:
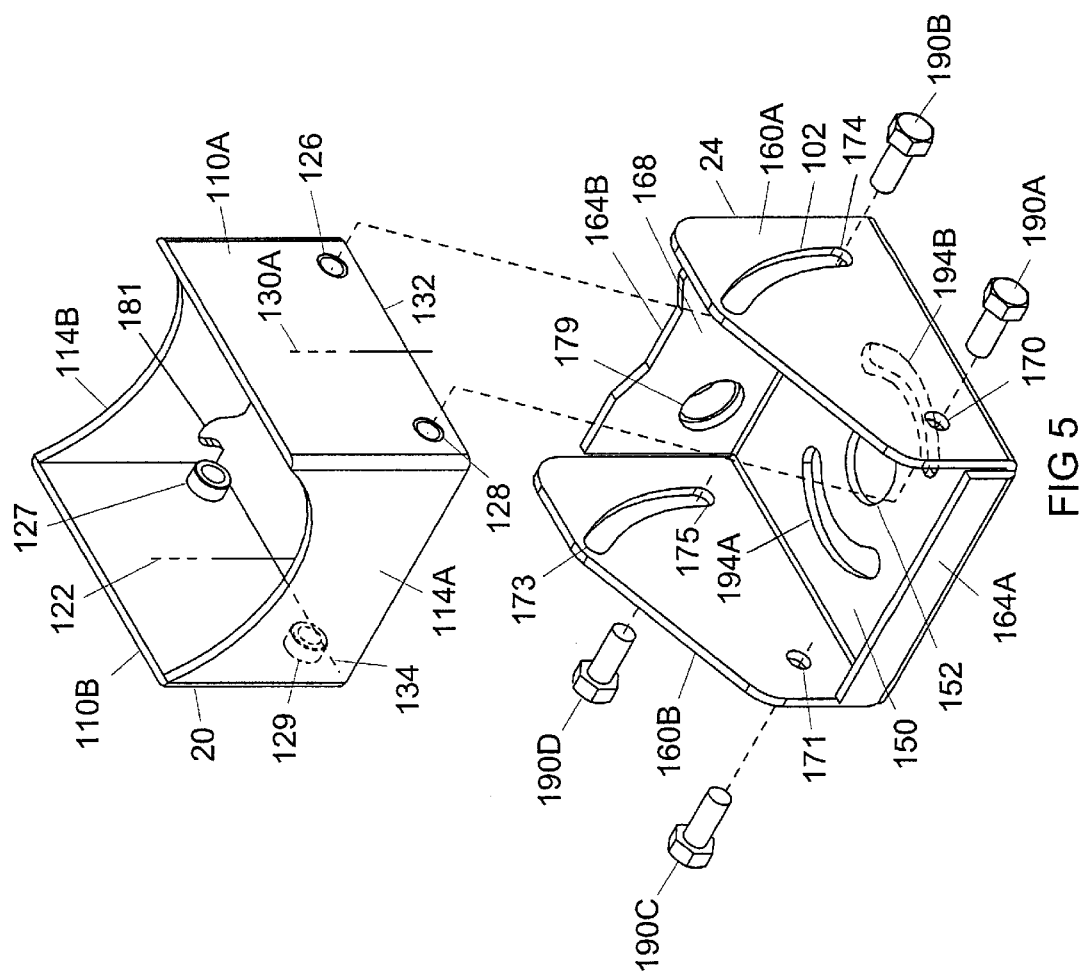
FIG. 5 is an exploded isometric view of the pan and tilt assembly utilized in the present invention.

Referring now to FIG. 5, housing cradle 20 is comprised of a first and second pair of spaced apart opposed walls, 110A, 110B and 114A, 114B, respectively. The walls extend substantially perpendicularly from exterior 118 of housing 12 and define a substantially enclosed cavity 122 therebetween. Walls of housing cradle 20 are positioned about openings 84, and, if provided, strain relief fittings 86. Four threaded holes 126, 128, 127, and 129 are provided in first pair of opposed walls 110A and 110B. Holes 126 and 128 are in wall 110A and holes 127 and 129 are in wall 110B. Hole 126 is opposite hole 127 and hole 128 is opposite hole 129. Holes 126 and 128 in wall 110A and holes 127 and 129 in wall 110B, respectively, are symmetrically positioned about their respective vertical centerlines 130, 131 and are adjacent the respective tops 132 and 134 of their respective walls.

Bracket 24 has a base 150 having an opening 152 therethrough for the passage of wires 100. Bracket 24 also has a first and second pair of spaced apart opposed walls, 160A, 160B and 164A 164B, respectively, extending substantially perpendicularly from base 150 and positioned about base opening 152. Base 150 and the wall pairs form a substantially enclosed central cavity 168 therebetween. Cavity 168 is sized to receive the housing cradle walls as shown in FIG. 4. Hole 170 and arcuate slot 172 are provided in wall 160A. Hole 171 and arcuate slot 173 are provided in wall 160B. Hole 170 is opposite hole 171 and slot 172 is opposite slot 173. End 174 of slot 172 and hole 170 are position adjacent base 150 and are also symmetrically positioned about the vertical centerline of wall 160. The radius of curvature for arcuate slot 172 is about the center of hole 170 and slot 170 extends toward the top of wall 160A. Hole 171 and slot 173 in the opposite wall are similarly positioned. Holes 126, 127, 128, 129, 170 and 171 are of approximately the same diameter and the widths of slots 172 and 173 are approximately the same size as the diameter of the holes. Opening 179 in wall 164B and notch 181 in wall 114B are vertically aligned with one another and provide an alternate wiring route into cavities 122, 168. A conduit fitting can be attached to bracket 24 using opening 179. Notch 181 is used to prevent pinching of any wires that may be entering the housing assembly via opening 179. With the second pair of opposed walls 164A, 164B in bracket 24, wall 164B is substantially the same height as the walls 110A or 114B while wall 164A is substantially shorter. This allows housing assembly 10 to tilt or pivot while also serving to block any opening or gap between the end of wall 114A of the housing cradle 20 and base 150 of bracket 24 thus protecting the camera wiring. Panning of the housing assembly can be done using a nipple threadably secured in base opening 152. Preferably, two opposed arcuate slots 194A, 194B are provided in base 150 coaxial with base opening 152 but spaced apart therefrom. These slots along with two bolts (see FIG. 4) that are threadably received in threaded openings in the mounting arm 81 allow for panning of the housing assembly within a predetermined range.

When housing cradle 20 is inserted into bracket 24 in a first or normal position, holes 170, 171, 128 and 129 are aligned while holes 126 and 127 and slots 173 and 172 are aligned. When housing cradle 20 is inserted into bracket 24 in a second or reverse position, holes 170, 171, 126 and 127 are aligned while holes 128 and 129 and slots 173 and 172 are aligned. Threaded bolts 190A–D are inserted through hole 170, slot 172, hole 171 and slot 173 respectively and are threaded into holes 128, 126, 129 and 127, respectively, to connect housing cradle 20 with bracket 24. As illustrated in FIG. 2, walls 110A, 110B, 114A and 114B of cradle 24 are held in a spaced apart relationship from base 150 of bracket 24 allowing for easier tilting. Housing assembly 10 can be tilted or pivoted about a tilt axis defined by bolts 190A and 190C. When the desired tilt position is reached, bolts 190A–190D are tightened. Flat washers 200 (see FIG. 6A) may also be used with bolts 190B and 190D. Bolts 190A–D, slots 172, 173, and holes 126–129 provide means for removably connecting the first pair of walls of the housing cradle with the first pair of walls in the bracket when the housing cradle is inserted into the bracket and the positioning of the holes keeps the end of the walls of the cradle in a spaced apart position with respect to the bracket base. This also allows the housing cradle to be adjustably tilted about the tilt axis within a pre-determined range as allowed by the length of the slots and to be fixed in place when the desired degree of tilt is achieved. With respect to the bracket, preferably four bolts are used for connecting the bracket to the housing cradle. However, a single bolt can be used which extends from one side of the bracket through the housing cradle and out the other side. We have found, however, that it is most cost effective to use the four bolts.

FIGS. 6A and 6B illustrate the reversible mounting feature of the housing assembly 10. FIG. 6A illustrates the housing unit when the housing cradle in inserted into the bracket in the first or normal position. As shown there the pivot or tilt axis is nearer to the front of the housing assembly. This position would typically be used for a roof top type mounting of the housing assembly 10. FIG. 6B illustrates the housing unit when the housing cradle is inserted into the bracket in the second or reversed position. As shown there the pivot or tilt axis is nearer to the rear of the housing assembly. This position would typically be used for an eaves-type or overhang type mounting. In FIG. 6B, it can be seen that bracket 24 has been reversed in position with respect to cradle housing 20.

FIGS. 7A and 7B illustrate the wiring protection feature of the housing assembly 10. In FIG. 7A the housing assembly 10 is shown in a level or non tilted position and the wires 100 are substantially enclosed by the pan and tilt mechanism 19. In FIG. 7B, the housing assembly is shown in its full tilted position. The walls of housing cradle 20 and bracket 24 still substantially enclose wires 100.

In use, once the mount for housing assembly 10 has been positioned in the desired location, housing 12 is then attached thereto via pan and tilt mechanism 19. The wiring is run into housing 12 and camera sled assembly 30 is connected to the wiring then inserted in housing 12. At this point in the setup for the unit 10 the following can occur in either order: (1) the camera is rotated into the proper orientation and the positioning means is engaged to fix the position of the camera sled assembly 30 orientation; (2) the unit 10 is then panned and tilted and then secured in its final position and (3) the ballistic lens assembly is then fasten to housing 12.

Other embodiments of the invention will be apparent to those skilled in the art from a consideration of the specification or from practice of the invention disclosed herein. It is intended that the specification be considered as exemplary only with the scope and spirit of the present invention being indicated by the following claims,

We claim:

1. A housing assembly permitting adjustable positioning of a surveillance camera enclosed therein after the camera is mounted, comprising:

a housing having a cylindrical camera opening therein for receiving the surveillance camera;

a camera sled for holding the surveillance camera, the camera sled being slidably receivable in and rotatable about the longitudinal axis of the camera opening and including positioning means for adjustably fixing the position and orientation of the camera sled assembly within the camera opening of the housing, said positioning means including a tab depending from the sled plate and adjacent the wall of the camera opening and having a threaded hole, therethrough; and a set screw threadably engaged in the threaded hole of the tab; and a detachable lens assembly for enclosing the camera sled and surveillance camera within the housing.

2. A housing assembly permitting adjustable positioning of a surveillance camera enclosed therein after the camera is mounted, comprising:

a housing having a cylindrical camera opening therein for receiving the surveillance camera;

a camera sled for holding the surveillance camera, the camera sled being slidably receivable in and rotatable about the longitudinal axis of the camera opening and including positioning means for adjustably fixing the position and orientation of the camera sled assembly within the camera opening of the housing, the positioning means comprising a cam rotatably mounted on the sled plate adjacent the wall of the camera opening; and a detachable lens assembly for enclosing the camera sled and surveillance camera within the housing.

3. A housing assembly permitting adjustable positioning of a surveillance camera enclosed therein after the camera is mounted, comprising:

a housing having a cylindrical camera opening therein for receiving the surveillance camera;

a camera sled for holding the surveillance camera, the camera sled being slidably receivable in and rotatable about the longitudinal axis of the camera opening and including positioning means for adjustably fixing the position and orientation of the camera sled assembly within the camera opening of the housing; and a detachable lens assembly for enclosing the camera sled and surveillance camera within the housing, the lens assembly further comprising:

an annular cap plate;

a cylindrical lens sized to be closely received within the camera opening;

a cylindrical transparent shield plate positioned between the cap plate and the lens; and fastening means for coaxially and removably attaching the lens and cylindrical transparent shield plate to the cap plate and for removably attaching the lens assembly to the housing so as to enclose the cylindrical transparent shield plate, lens, sled assembly and surveillance camera within the housing.

4. The housing assembly of claim 3 wherein the lens and cylindrical transparent shield plate are each made from a material chosen from the following group: ballistic grade polycarbonate, polycarbonate, acrylic, styrene and glass.

5. The housing assembly of claim 3, wherein the housing further comprises:

a housing cradle having a first and second pair of spaced apart opposed walls attached thereto, the walls extending substantially perpendicularly from the exterior of the housing and defining a substantially enclosed cavity therebetween;

the housing having an opening therethrough positioned between the walls of the housing cradle for the passage of the camera cabling;

a bracket having a base having a opening therethrough and a first and second pair of spaced apart opposed walls extending substantially perpendicularly from the base and positioned about the base opening, the base and wall pairs forming a substantially enclosed central cavity therebetween sized to receive the housing cradle walls, the second pair of bracket walls having one wall being substantially the same height as the walls in the first pair with the other wall being shorter in height than the other walls to allow for the tilting of the housing about a tilt axis adjacent to and substantially parallel with the shorter wall; and means for removably connecting the first pair of walls of the housing cradle with the first pair of walls In the bracket when the cradle is inserted into the bracket so as to keep the ends of the walls of the housing cradle in a spaced apart position from the bracket base and to allow the housing cradle to be adjustably tilted about the tilt axis within a predetermined range with respect to the bracket base and to be fixed in place when a desired degree of tilt is achieved with the walls of the bracket and the housing cradle forming a passageway substantially enclosing the camera cabling when the housing Is tilted within the predetermined range.

6. A housing assembly permitting the adjustable positioning a surveillance camera enclosed therein, comprising:

a housing having a cylindrical camera opening therein for receiving the surveillance camera, the camera opening extending along the longitudinal axis of the housing:

a camera sled assembly slidably receivable in and rotatable about the longitudinal axis of the camera opening, comprising:

an annular sled plate closely receivable in the camera opening and rotatable about the longitudinal axis of the camera opening;

a camera bed depending from one surface of the sled flange for mounting the surveillance camera such that the camera lens is substantially aligned with the camera opening and the sled plate opening;

positioning means for adjustable fixing the position and orientation of the camera sled assembly within the camera opening; and a detachable lens assembly comprising:

an annular cap plate;

a cylindrical lens sized to be closely received within the camera opening; and fastening means for coaxially and removably attaching the lens to the cap plate and for removable attaching the lens assembly to the housing so as to enclose the lens, sled assembly and surveillance camera within the housing.

7. The housing assembly of claim 6 wherein the sled assembly further comprises a second sled plate depending from the end of the camera bed opposite the annular sled plate, the second annular sled plate having at least one opening therethrough positioned about the longitudinal axis of the camera opening and being closely receivable in and rotatable about the longitudinal axis of the camera opening.

8. The housing assembly of claim 6 wherein the lens is made from a material chosen from the following group: ballistic grade polycarbonate, polycarbonate, acrylic, styrene and glass.

9. The housing assembly of claim 6 wherein the lens assembly further comprises a removable cylindrical transparent shield plate positioned between the cap plate and the lens.

10. The housing assembly of claim 9 wherein the lens and protective shield plate are each made from a material chosen from the following group: ballistic grade polycarbonate, polycarbonate, acrylic, styrene and glass.

11. The housing assembly of claim 6 wherein the positioning means comprises:
   a tab depending from the sled plate and adjacent the wall of the camera opening and having a threaded hole there through; and
   a set screw threadably engaged in the threaded hole of the tab.

12. The housing assembly of claim 6 wherein the positioning means comprises a cam rotatably mounted on the sled plate adjacent the wall of the camera opening.

13. The housing assembly of claim 6 wherein the housing further comprises:
   a housing cradle having a first and second pair of spaced apart opposed walls attached thereto, the walls extending substantially perpendicularly from the exterior of the housing and defining a substantially enclosed cavity therebetween;
   the housing having an opening therethrough positioned between the walls of the housing cradle for the passage of the camera cabling;
   a bracket having a base having an opening therethrough and a first and second pair of spaced apart opposed walls extending substantially perpendicularly from the base and positioned about the base opening, the base and wall pairs forming a substantially enclosed central cavity therebetween sized to receive the housing cradle walls, the second pair of bracket walls having one wall being substantially the same height as the walls in the first pair with the other wall being shorter in height than the other walls to allow for the tilting of the housing about a tilt axis adjacent to and substantially parallel with the shorter wall; and
   means for removably connecting the first pair of walls or the housing cradle with the first pair of walls in the bracket when the cradle is inserted into the bracket so as to keep the ends of the walls of the housing cradle in a spaced apart position from the bracket base and to allow the housing cradle to be adjustably tilted about the tilt axis within a predetermined range with respect to the bracket base and to be fixed in place when a desired degree of tilt is achieved with the walls of the bracket and the housing cradle forming a passageway enclosing the camera cabling when the housing is tilted within the predetermined range.

14. A housing assembly permitting the adjustable positioning a surveillance camera enclosed therein after the housing is mounted, comprising:
   a housing having a cylindrical camera opening therein for receiving the surveillance camera, a portion of the wall of the camera opening having threads;
   a camera sled for holding the surveillance camera, the camera sled being slidably receivable in and rotatable about the longitudinal axis of the camera opening and including positioning means for adjustably fixing the position and orientation of the camera sled assembly within the camera opening; and
   a detachable lens assembly for enclosing the camera sled and surveillance camera within the housing comprising:
      an annular cap plate having an outer dimension so as to be closely received in the camera opening and having threads about a portion of the edge of the plate for engaging the threaded wall portion of the camera opening;
      an annular gasket having substantially the same outer and inner diameters as the cap plate;
      a cylindrical transparent shield plate having the same outer diameter as the cap plate;
      a cylindrical lens having substantially the same outer diameter as the cap plate;
      an annular end plate having substantially the same outer diameter as the cap plate; and
      fastening means for removably attaching the lens assembly together.

15. The housing assembly of claim 14 wherein the positioning means comprises:
   a tab depending from the sled plate and adjacent the wall of the camera opening and having a threaded hole there through; and
   a set screw threadably engaged in the threaded hole of the tab.

16. The housing assembly of claim 14 wherein the positioning means comprises a cam rotatably mounted on the sled plate adjacent the wall of the camera opening.

17. The housing assembly of claim 14 wherein the lens and protective shield plate are each made from a material chosen from the following group: ballistic grade polycarbonate, polycarbonate, acrylic, styrene and glass.

18. The housing assembly of claim 14 wherein the housing further comprises:
   a housing cradle having a first and second pair of spaced apart opposed walls attached thereto, the walls extending substantially perpendicularly from the exterior of the housing and defining a substantially enclosed cavity therebetween;
   the housing having an opening therethrough positioned between the walls of the housing cradle for the passage of the camera cabling;
   a bracket having a base having an opening therethrough and a first and second pair of spaced apart opposed walls extending substantially perpendicularly from the base and positioned about the base opening, the base and wall pairs forming a substantially enclosed central cavity therebetween sized to receive the housing cradle walls, the second pair of bracket walls having one wall being the substantially same height as the walls in the first pair with the other wall being shorter in height than the other walls to allow for the tilting of the housing about a tilt axis adjacent to and substantially parallel with the shorter wall; and
   means for removably connecting the first pair of walls to the housing cradle with the first pair of walls in the bracket when the cradle is inserted into the bracket so as to keep the ends of the walls of the housing cradle in a spaced apart position from the bracket base and to allow the housing cradle in a spaced apart position from the bracket base and to allow the housing cradle to be adjustably titled about the tilt axis within a predetermine range with respect to the bracket base and to be fixed in place when a desired degree of tilt is achieved with the walls of the bracket and the housing cradle forming a passageway substantially enclosing the camera cabling when the housing is tilted within the predetermined range.

19. A lens assembly for use in a housing assembly enclosing a surveillance camera, comprising:
   an annular cap end plate;
   an annular gasket having substantially the same outer diameter as the cap plate;
   a cylindrical transparent shield plate having substantially the same outer diameter as the cap plate;

a cylindrical lens having substantially the same outer diameter as the cap plate;

an annular end plate having substantially the same outer diameter as the cap plate; and fastening means for removably attaching the assembly together.

20. The lens assembly of claim 19 wherein the lens and protective shield plate are each made from a material chosen from the following group: ballistic grade polycarbonate, polycarbonate, acrylic, styrene and glass.

21. A lens assembly for use in a housing assembly enclosing a surveillance camera, the housing assembly having a flange having a plurality of holes radially positions at a radial distance from the centerline of the housing assembly, comprising;

an annular front end plate having a first plurality of holes therethrough radially positioned at a first radial distance from the center of the front end plate and aligned with those holes in the housing assembly flange and a second plurality of holes therethrough positioned at a second radial distance from the center of the front end plate which is less than the first radial distance;

an annular first gasket having a plurality of holes therethrough corresponding to and aligned with those in the first plurality of holes in the front end plate with the inner diameter of the gasket being greater than the inner diameter of the front end plate;

an annular second gasket having a plurality of holes therethrough corresponding to and aligned with those in the second plurality of holes in the front end plate, the outer diameter of the second gasket being less than the inner diameter of the annular first gasket and the inner diameter of the second gasket being substantially the same as the inner diameter of the front end plate;

a cylindrical transparent shield plate having a plurality of holes therethrough corresponding to and aligned with those in the second plurality of holes in the front end plate and having an outer diameter substantially the same as the outer diameter of the second gasket;

a cylindrical lens having a plurality of holes therethrough corresponding to and aligned with those in the second plurality of holes in the front end plate and having an outer diameter substantially the same as the outer diameter of the second gasket;

an annular end plate having inner and outer diameters corresponding to those of the second gasket and a plurality of holes therethrough corresponding to and aligned with those in the second plurality of holes in the front end plate;

first fastening means using the aligned holes in the front end plate, the second gasket, the shield plate, the lens and the end plate for removably fastening the lens assembly together; and second fastening means using the aligned holes in the front end plate and first gasket for removably attaching the assembly to the housing.

22. The lens assembly of claim 21 wherein the lens and protective shield plate are each made from a material chosen from the following group: ballistic grade polycarbonate, polycarbonate, acrylic, styrene and glass.

23. A housing assembly comprising:

a housing for receiving a surveillance camera, said housing defining an opening therein; and a lens assembly detachably mounted to said housing covering said opening to enclose the surveillance camera, said lens assembly comprising a lens and a replaceable protective shield overlying said lens.

* * * * *